US011230326B2

(12) United States Patent
Elder et al.

(10) Patent No.: US 11,230,326 B2
(45) Date of Patent: Jan. 25, 2022

(54) VEHICLE ACCESSORY PORT AND PLUG

(71) Applicant: Rivian IP Holdings, LLC, Plymouth, MI (US)

(72) Inventors: Christian Elder, Sylvan Lake, MI (US); Eric Griffith, Farmington Hills, MI (US)

(73) Assignee: Rivian IP Holdings, LLC, Plymouth, MI (US)

( * ) Notice: Subject to any disclaimer, the term of this patent is extended or adjusted under 35 U.S.C. 154(b) by 70 days.

(21) Appl. No.: 16/190,126

(22) Filed: Nov. 13, 2018

(65) Prior Publication Data

US 2020/0148280 A1 May 14, 2020

(51) Int. Cl.
| | |
|---|---|
| *B62D 33/02* | (2006.01) |
| *B60R 9/058* | (2006.01) |
| *B60R 16/03* | (2006.01) |
| *B60Q 1/00* | (2006.01) |
| *B60Q 1/30* | (2006.01) |
| *B60R 9/052* | (2006.01) |

(52) U.S. Cl.
CPC ....... *B62D 33/0207* (2013.01); *B60Q 1/0035* (2013.01); *B60Q 1/30* (2013.01); *B60R 9/052* (2013.01); *B60R 9/058* (2013.01); *B60R 16/03* (2013.01)

(58) Field of Classification Search
CPC .... B60R 9/00; B60R 9/02; B60R 9/04; B60R 9/052; B60R 9/058; B60R 9/06; B60R 9/08; B60R 9/10; B60R 9/112; B60R 2011/0061; B60R 2011/0078; B60R 16/03; B62D 33/0207; B60P 7/0807; B60Q 1/0035; B60Q 1/30

USPC ........ 410/101, 106, 108, 109, 110, 112, 113, 410/114, 115; 296/43; 105/380, 382, 105/390; 403/361
See application file for complete search history.

(56) References Cited

U.S. PATENT DOCUMENTS

| | | | | |
|---|---|---|---|---|
| 1,168,982 | A | * | 1/1916 | Walker ...................... B63C 7/00 114/382 |
| 1,728,481 | A | | 9/1929 | Fino |
| 2,415,479 | A | | 2/1947 | Forney |
| 2,678,150 | A | | 5/1954 | Lund |
| RE24,032 | E | * | 7/1955 | Johnson ............... B61D 45/001 410/112 |

(Continued)

FOREIGN PATENT DOCUMENTS

WO    WO 93/20601    10/1993

OTHER PUBLICATIONS

Invitation to Pay Additional Fees / Partial International Search from PCT/US2019/061318 dated Apr. 17, 2020.

*Primary Examiner* — Hilary L Gutman
(74) *Attorney, Agent, or Firm* — Haley Guiliano LLP

(57) ABSTRACT

A vehicle may include an integrated connector system. The vehicle includes a body having an outer surface and a plurality of attachment ports arranged on the outer surface. The attachments ports include a recess that extends below the surrounding outer surface. Each attachment port is configured to receive and engage with an attachment plug of an accessory. In some embodiments, there are different types of attachment ports, configured to engage with respective types of attachment plugs. Various accessories may be engaged with the attachment ports, allowing a range of items and equipment to be secured to the vehicle.

23 Claims, 9 Drawing Sheets

(56) References Cited

U.S. PATENT DOCUMENTS

| | | | | |
|---|---|---|---|---|
| RE24,033 E | * | 7/1955 | Johnson | B61D 45/001 410/112 |
| 2,731,292 A | | 1/1956 | Cole | |
| 2,733,671 A | * | 2/1956 | Sheesley et al. | B61D 45/001 410/114 |
| 2,825,799 A | * | 3/1958 | Julien | B60Q 7/00 362/549 |
| 2,843,060 A | * | 7/1958 | Sladek | B61D 45/00 410/112 |
| 2,876,712 A | * | 3/1959 | Oakley | B61D 45/00 410/112 |
| 2,939,406 A | * | 6/1960 | Wilkoff | B61D 45/001 410/115 |
| 3,038,394 A | * | 6/1962 | Brinker | B63B 25/28 114/218 |
| 3,253,310 A | | 5/1966 | McCarthy | |
| 3,257,971 A | * | 6/1966 | Swendsen | B60P 7/0807 410/115 |
| 3,280,439 A | | 10/1966 | McCarthy | |
| 3,345,711 A | | 10/1967 | McCarthy | |
| 3,572,755 A | * | 3/1971 | Baldwin | B60P 7/0807 410/110 |
| 3,661,420 A | | 5/1972 | Swanson | |
| 3,674,304 A | | 7/1972 | Swanson | |
| 3,838,802 A | | 10/1974 | Grycel | |
| 3,841,695 A | | 10/1974 | Woodward | |
| 4,060,036 A | * | 11/1977 | Palms | B60P 3/075 410/21 |
| 4,105,347 A | | 8/1978 | Gossage | |
| 4,395,064 A | * | 7/1983 | Bellot | E05B 81/20 292/201 |
| 4,404,714 A | | 9/1983 | Duran | |
| 4,630,990 A | * | 12/1986 | Whiting | B60R 9/042 224/310 |
| 4,902,051 A | | 2/1990 | Poe | |
| 4,955,660 A | | 9/1990 | Leonard | |
| 4,958,875 A | | 9/1990 | Zamzow | |
| 5,011,349 A | * | 4/1991 | McAndrews | A44B 11/25 24/197 |
| 5,020,835 A | | 6/1991 | Poe | |
| 5,108,141 A | | 4/1992 | Anderson | |
| 5,255,951 A | | 10/1993 | Moore | |
| 5,257,728 A | | 11/1993 | Gibson | |
| 5,306,156 A | * | 4/1994 | Gibbs | B60Q 1/302 224/315 |
| 5,378,094 A | * | 1/1995 | Martin | B60P 7/0807 248/499 |
| 5,431,472 A | | 7/1995 | Coffland | |
| 5,673,956 A | * | 10/1997 | Emery | B60R 13/01 296/208 |
| 5,725,137 A | | 3/1998 | Macdonald | |
| 6,290,441 B1 | * | 9/2001 | Rusu | B60P 7/0807 296/100.07 |
| 6,372,986 B1 | | 4/2002 | Saeki | |
| 6,374,466 B1 | | 4/2002 | Macias | |
| 6,382,699 B1 | * | 5/2002 | Hanson | B60J 7/141 296/100.07 |
| 6,481,604 B1 | | 11/2002 | Beene | |
| 6,527,154 B2 | * | 3/2003 | Larsen | B60R 5/00 224/545 |
| 6,666,504 B2 | * | 12/2003 | Guanzon | B60P 7/0807 296/216.04 |
| 6,752,302 B2 | | 6/2004 | Anton | |
| 6,766,913 B2 | | 7/2004 | Steen | |
| 6,969,219 B2 | | 11/2005 | Speece | |
| 7,073,857 B1 | | 7/2006 | Bailey | |
| 7,568,748 B2 | | 8/2009 | Tarquinio | |
| 7,594,478 B2 | | 9/2009 | Karnes | |
| 7,789,462 B2 | * | 9/2010 | Glover | B60N 2/2893 297/254 |
| 7,845,702 B2 | | 12/2010 | Barna | |
| 7,976,089 B2 | | 7/2011 | Jones | |
| 8,057,142 B1 | * | 11/2011 | Alamillo | B60P 7/0807 410/101 |
| 8,444,034 B2 | | 5/2013 | Bennett | |
| D704,536 S | * | 5/2014 | Porta | D8/356 |
| 8,727,403 B2 | * | 5/2014 | Johnson | E05B 15/022 292/340 |
| 8,875,963 B2 | | 11/2014 | Knutson | |
| 8,882,419 B2 | | 11/2014 | Aguirre | |
| 8,905,280 B2 | | 12/2014 | Martin | |
| 9,066,576 B1 | | 6/2015 | Stassinos | |
| 9,072,368 B2 | | 7/2015 | Mueller | |
| 9,179,759 B1 | | 11/2015 | Turner | |
| D761,086 S | * | 7/2016 | Zeidler | D8/356 |
| 9,493,123 B2 | | 11/2016 | Martin | |
| 9,555,735 B2 | * | 1/2017 | Kerr, III | B60J 7/141 |
| 9,878,675 B2 | | 1/2018 | George | |
| 10,035,472 B1 | | 7/2018 | Turner | |
| 10,131,289 B2 | | 11/2018 | Frederick | |
| 10,173,575 B2 | | 1/2019 | Tyler | |
| 10,189,510 B1 | | 1/2019 | Higgins | |
| 10,259,559 B2 | | 4/2019 | Terry | |
| 10,427,616 B2 | | 10/2019 | Wilckens | |
| 10,472,022 B1 | | 11/2019 | Pollen | |
| 10,479,427 B2 | | 11/2019 | Scaringe | |
| 10,703,252 B2 | | 7/2020 | Westfall | |
| 2005/0079026 A1 | * | 4/2005 | Speece | B60P 7/0807 410/106 |
| 2006/0099044 A1 | | 5/2006 | Johnson | |
| 2008/0121671 A1 | | 5/2008 | Cronce | |
| 2011/0083268 A1 | | 4/2011 | Finch | |
| 2013/0149029 A1 | | 6/2013 | Changsrivong | |
| 2016/0058197 A1 | | 3/2016 | Jungling | |
| 2016/0167717 A1 | | 6/2016 | Marchlewski | |
| 2017/0058561 A1 | | 3/2017 | Terry | |
| 2017/0066383 A1 | | 3/2017 | Benedict | |
| 2020/0031406 A1 | | 1/2020 | Flores | |
| 2020/0047681 A1 | | 2/2020 | Westcott | |
| 2020/0148126 A1 | * | 5/2020 | Griffith | B60R 9/045 |
| 2020/0148127 A1 | | 5/2020 | Borghi | |
| 2020/0148280 A1 | | 5/2020 | Elder | |
| 2020/0149316 A1 | * | 5/2020 | Parker | E05B 39/00 |

\* cited by examiner

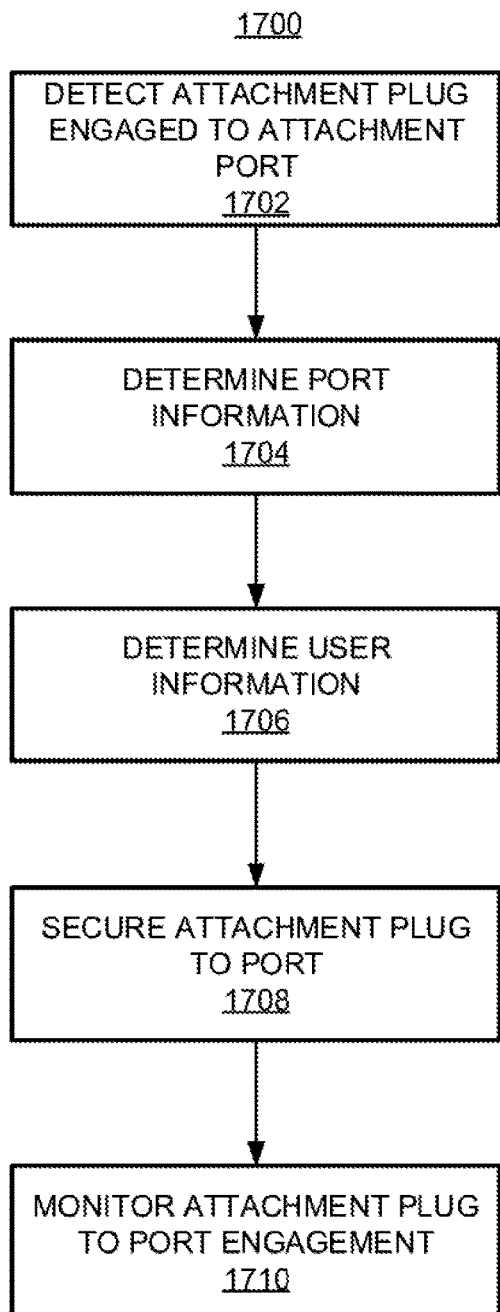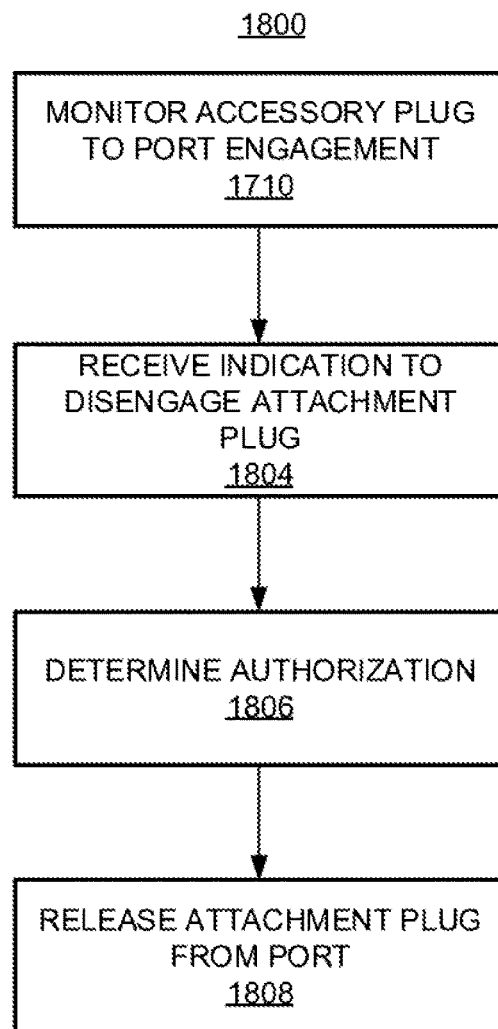
FIG. 17
FIG. 18

VEHICLE ACCESSORY PORT AND PLUG

BACKGROUND

People use vehicles to transport recreational equipment, tools, or other equipment. Most passenger vehicles include interior room for a driver and passengers, and some cargo room such as a trunk, hatch, or bed. Outsized equipment, or other equipment that is not desired to be stored in the cabin is sometimes mounted to roof racks, cargo beds, or other exterior areas of the vehicle. Typically, different types of equipment are mounted using different types of anchoring to the vehicle. For example, skis, surfboards and kayaks are typically transported on roof racks. Bicycles, for example, are transported on roof racks, trailer-hitch-mounted racks, trunk racks, or in a cargo bed. It would be advantageous to provide an easy to use universal and adaptive mounting system for equipment having different mounting needs.

SUMMARY

The present disclosure is directed to a port and connector system. Conventional mounting hardware typically requires intermediate support structure and adapters for mounting on a vehicle. For example, a conventional roof rack typically includes an adapter mechanism that needs to be manually adjusted and position on the vehicle. Such roof racks are difficult to install and are typically left on a vehicle after use because it is time consuming to uninstall and reinstall again when needed in the future. In addition, while conventional mounting hardware provides mechanical securement, it can be susceptible to mechanical destruction by an unauthorized user. Although mechanical destruction may require specialized tools, know-how, and opportunity, there is little to alert the equipment owner that the securement has been compromised or damaged. It would therefore be desirable for an equipment mounting system to be easy to use. It would also be desirable for an equipment mounting system to provide an indication to a user that it has been compromised, other than an after-the-fact observation by the user.

In some embodiments, the present disclosure is directed to a vehicle having an integrated connector system. The vehicle includes a body having an outer surface and a plurality of attachment ports arranged on the outer surface. Each of the plurality of attachment ports includes a recess that extends below the surrounding outer surface. Each of the plurality of attachment ports is configured to receive and engage with an attachment plug of an accessory.

In some embodiments, each of the plurality of attachment ports includes a pin extending between two opposing sides of the recess. A latching mechanism of the accessory is configured to engage the pin.

In some embodiments, each respective recess includes a perimeter arranged substantially in the plane of the surrounding outer surface. Each respective recess includes a rounded quadrilateral and a full depth from the surrounding outer surface configured to accept the attachment plug. The pin is arranged at a depth less than the full depth within the recess.

In some embodiments, each of the plurality of attachment ports includes a rim extending between the recess and the surrounding outer surface. In some embodiments, the rim extends less than 10 millimeters above the surrounding outer surface.

In some embodiments, the body includes one or more structural elements and each of the plurality of attachment ports is mechanically coupled to one of the one or more structural elements.

In some embodiments, the outer surface includes a roof surface having a left side and a right side. The plurality of attachment ports includes two attachment ports arranged on the left side of the roof surface and two attachment ports arranged on the right side of the roof surface.

In some embodiments, the body includes a truck bed having a left-side rail and a right-side rail, and the outer surface includes a top surface of the left-side rail and a top surface of the right-side rail. In some such embodiments, the plurality of attachment ports includes two attachment ports arranged on the top surface of the left-side rail and two attachment ports arranged on the top surface of the right-side rail.

In some embodiments, the outer surface includes a truck bed having a left-bottom surface and a right-bottom surface. In some such embodiments, the plurality of attachment ports includes two attachment ports arranged on the left-bottom surface and two attachment ports arranged on the right-bottom surface.

In some embodiments, the body includes a truck bed having a left-side rail and a right-side rail. The outer surface includes a roof surface, top surfaces of the left-side rail and the right-side rail, and a truck bed surface. In some such embodiments, the plurality of attachment ports includes a first pair of attachment ports arranged on the roof surface a first lateral distance away from each other, a second pair of attachment ports arranged on the top surfaces a second lateral distance away from each other, and a third pair of attachment ports arranged on the truck bed surface a third lateral distance away from each other. In some embodiments, the first lateral distance is greater than the second lateral distance and the second lateral distance is greater than the third lateral distance.

In some embodiments, the plurality of attachment ports includes a first pair of attachment ports arranged on a first portion of the outer surface a first lateral distance away from each other and a second pair of attachment ports arranged on a second portion of the outer surface a second lateral distance away from each other. The first lateral distance is greater than the second lateral distance. An accessory is configured to engage with the first pair of attachment ports in a first configuration and engage with the second pair of attachment ports in a second configuration.

In some embodiments, the plurality of attachment ports includes a first pair of attachment ports arranged on a first portion of the outer surface at a first height and a second pair of attachment ports arranged on a second portion of the outer surface at a second height. In some such embodiments, the first height is different than the second height by more than 150 millimeters.

In some embodiments, a first accessory is configured to engage with the first pair of attachment ports. The attachment ports include a respective pin. When the first accessory is engaged with the first pair of attachment ports, the respective pin is positioned at a third height relative to the attachment plug. In some embodiments, a second accessory is configured to engage with the second pair of attachment ports. The second accessory includes a second pin and, when the second accessory is engaged with the second pair of attachment ports, the second pin is positioned at a fourth height relative to the attachment plug. The third height is substantially similar to the fourth height.

In some embodiments, the first portion of the outer surface includes a roof surface and the second portion of the outer surface includes top surfaces of a left-side rail and a right-side rail of a truck bed.

In some embodiments, the recess of at least one of the plurality of attachment ports includes an electrical connector configured to provide power to an accessory engaged with the recess. In some such embodiments, the electrical connector provides a voltage potential across two electrical terminals. In some embodiments, the accessory includes a light and the electrical connector is configured to provide power to the light when the accessory is engaged with an attachment port having the electrical connector.

In some embodiments, the vehicle includes control circuitry. At least one of the plurality of attachment ports includes at least one electrical terminal coupled to the control circuitry. An actuated locking mechanism is configured to lock the attachment plug of the accessory to the attachment port, wherein the control circuitry is configured to control the actuated locking mechanism.

In some embodiments, each of the plurality of attachment ports includes a pin extending between two opposing sides of the recess. The attachment plug includes a body configured to extend into the recess, a notch configured to accommodate the pin, and a latching mechanism configured to engage with the pin and constrain relative motion of the attachment plug away from the attachment port. In some embodiments, the latching mechanism includes an arm configured to rotate relative to the bode to engage the pin when the notch is engaged with the pin.

In some embodiments, the present disclosure is directed to a system for mounting equipment to a vehicle. The system includes a plurality of attachment ports, at least one accessory configured to engage with the at least one attachment port of the plurality of attachment ports, and control circuitry. Each attachment port includes a latching mechanism and at least one of the attachment ports includes a first electrical terminal. The accessory includes an attachment plug configured to engage the latching mechanism. The attachment plug includes a second electrical terminal configured to engage with the first electrical terminal. The control circuitry is electrically coupled to the first electrical terminal and configured to detect if the attachment plug is engaged with the attachment port.

In some embodiments, the latching mechanism includes a power latch and the control circuitry is further configured to secure and release the power latch.

In some embodiments, the system includes a sensor coupled to the control circuitry and configured to detect when the attachment plug is engaged with the at least one attachment port.

In some embodiments, the sensor includes a switch configured to provide a binary indication of whether the attachment plug is engaged or not with the at least one attachment port.

In some embodiments, the control circuitry is configured to identify the at least one attachment port based on detecting when the attachment plug is engaged.

In some embodiments, the present disclosure is directed to a vehicle system. The vehicle system includes a vehicle body having a front, a back, two sides, and an outer surface. The vehicle system also includes a first attachment port arranged on the outer surface proximate to one side of the vehicle body, the first attachment port having a first recess. The vehicle system also includes a second attachment port arranged on the outer surface proximate to the one side of the vehicle body, the second attachment port having a second recess. The vehicle system also includes a first accessory and a second accessory. The first accessory includes a first attachment plug configured to be inserted into the first recess of the first attachment port and the second accessory includes a second attachment plug configured to be inserted into the second recess of the second attachment port.

In some embodiments, the first accessory includes one and only one attachment plug and the second accessory includes one and only one attachment plug.

In some embodiments, the first accessory includes a first support structure having a first cradle configured to receive a portion of an object. In some embodiments, the second accessory includes a second support structure having a second cradle configured to receive a portion of the object. In some embodiments, the first cradle includes a first j-style cradle and the second cradle includes a second j-style cradle. A j-style cradle includes two arms, arranged at angles to each other, with one are being longer than the other.

In some embodiments, the object is a kayak, the first cradle is configured to receive a first portion of the kayak, the second cradle is configured to receive a second portion of the kayak, and the first cradle and second cradle operate together to support the kayak. For example, the first and second cradle may include a v-style cradle including two arms, arranged at angles to each other and having roughly the same length.

In some embodiments, when the object is resting on the first cradle and the second cradle, forces are exerted on the first cradle and the second cradle by the object. The first attachment port and the second attachment provide opposing forces to the first accessory and the second accessory to oppose the forces exerted by the object.

In some embodiments, the first attachment port is arranged on a roof surface on the one side of the vehicle body and the second attachment port is arranged on the roof surface on the one side of the vehicle body.

In some embodiments, the vehicle body includes a truck bed having side rails. The first attachment port is arranged on a top surface of one of the side rails and the second attachment port is arranged on a top surface of the one side rail.

In some embodiments, the vehicle body includes a truck bed surface. The first attachment port is arranged on a side of the truck bed surface and the second attachment port is arranged on the side of the truck bed surface.

In some embodiments, the first attachment port includes a first port shape, the second attachment port includes a second port shape, and the first port shape and the second port shape are different.

In some embodiments, the first attachment port and the second attachment port are designed to support different loads.

In some embodiments, the first attachment plug includes a first plug shape, the second attachment plug includes a second plug shape, and the first plug shape and the second plug shape are different.

In some embodiments, the first attachment plug is capable of being inserted into both the first recess of the first attachment port and the second recess of the second attachment port, but the second attachment plug is not capable of being inserted into the first recess of the first attachment port.

In some embodiments, the first attachment port is designed for light loads and the second attachment port is designed for heavy loads.

In some embodiments, the second attachment plug includes a protrusion and the second recess of the second attachment port includes an indentation to accommodate the protrusion of the second attachment plug. The first recess of the first attachment port is not shaped to accommodate the protrusion of the second attachment plug.

In some embodiments, the vehicle body includes one or more structural elements. The first attachment port is mechanically coupled to one of the one or more structural elements and the second attachment port is mechanically coupled to one of the one or more structural elements. Each of the plurality of attachment ports is mechanically coupled to one of the one or more structural elements.

In some embodiments, the first accessory includes a first cantilever structure that is capable of extending away from the vehicle body and the second accessory includes a second cantilever structure that is capable of extending away from the vehicle body. The first cantilever structure and the second cantilever structure are configured to operate together to support a load suspended therefrom.

In some embodiments, the load includes a hammock having a first end and a second end. The first end is coupled to the first cantilever structure and the second end is coupled to the second cantilever structure.

In some embodiments, the first cantilever structure and the second cantilever structure are capable extending out to a side of the vehicle corresponding to the one side.

In some embodiments, each of the plurality of attachment ports includes a pin extending between two opposing sides of the recess, and a latching mechanism of the accessory is configured to engage the pin.

In some embodiments, each respective recess includes a perimeter arranged substantially in the plane of the surrounding outer surface including a rounded quadrilateral. Each respective recess includes a full depth from the surrounding outer surface configured to accept the attachment plug, wherein the pin is arranged at a depth less than the full depth within the recess.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

FIG. 17 shows a flowchart of an illustrative process for securing an attachment plug, in accordance with some embodiments of the present disclosure; and FIG. 18 shows a flowchart of an illustrative process for releasing an attachment plug, in accordance with some embodiments of the present disclosure.

DETAILED DESCRIPTION

Figure 1:
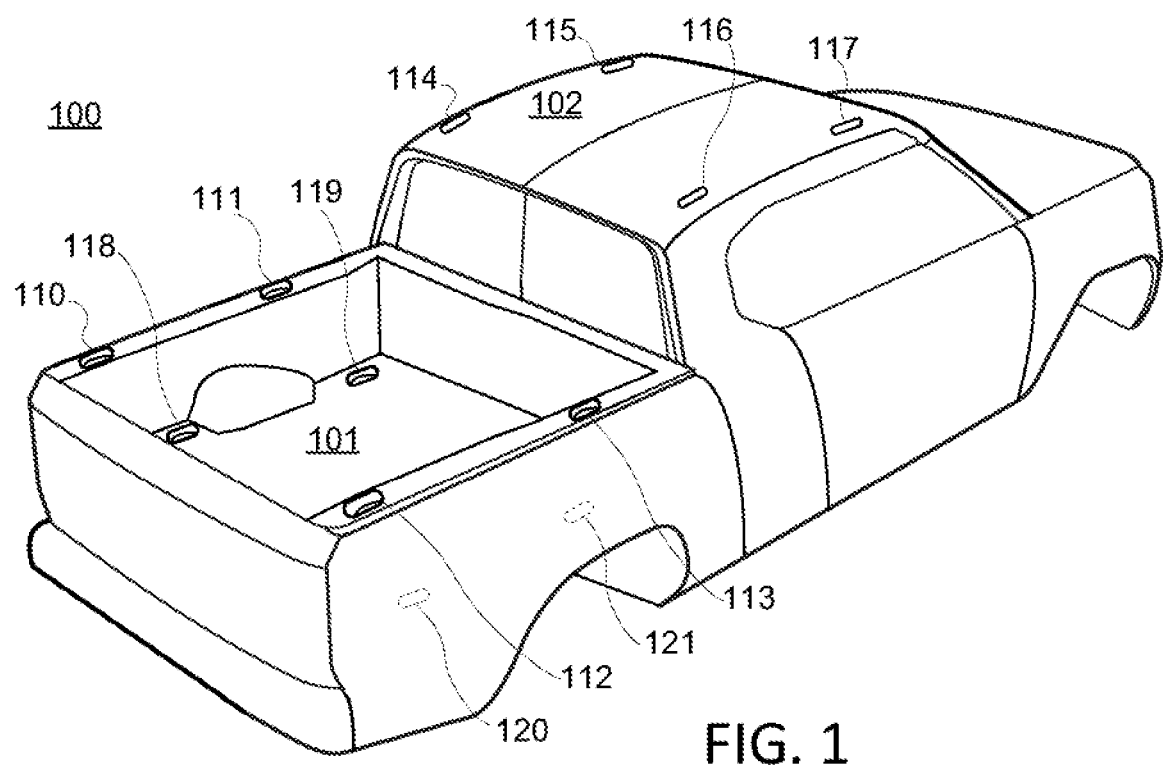
FIG. 1 shows a perspective view of an illustrative vehicle that includes a plurality of attachment ports, in accordance with some embodiments of the present disclosure.

The present disclosure is directed to a vehicle having integrated attachment ports that enable secure attachment of accessories to the exterior or interior of a vehicle. For example, integrated attachment ports may be integrated into a vehicle body (e.g., be made of the same material, have the same styling, be flush with the vehicle surface). In a further example, attachment ports may be affixed to the body itself, a vehicle frame, a structural member, or any other suitable outer component (e.g., a body panel or valence), inner component (e.g., a frame member or non-exterior component), or any combination thereof. In some embodiments, the present disclosure is directed to systems that ease and hasten the installation and removal of a vehicle accessory. Accessories may include, for example, mounting rails (e.g., for skis, surfboards, or other equipment), mounting posts (e.g., to adjust the level of mounting rails, equipment mounts (e.g., for kayaks or other equipment), auxiliary equipment (e.g., a generator or a pump), or a combination thereof. For example, the attachment port may provide a rigid, high-strength mechanical connection between the accessory and the vehicle. In a further example, the attachment port may provide security by suitable control circuitry managing the engagement of accessories with the vehicle.

In some embodiments, an attachment port includes a receiving feature configured to receive and engage with an accessory containing a complementing feature. In some embodiments, the accessory is secured to the port mechanically (e.g., using a mechanism) with a user interface that is easy to understand and straightforward for the user to interact with. For example, the interface may include a mechanical button or lever. In a further example, the user interface is not limited to external forces being applied to moving parts. In some embodiments, the interface may be activated by human interaction with control circuitry, which in turn actuates an included latching mechanism. For example, the user may cause the accessory to engage with the port, and then control circuitry may cause the engagement to be secured. In a further example, a latching mechanism may be driven by a motor, solenoid, any other suitable actuator, or any combination thereof. In some embodiments, the user may provide an indication to lock the accessory, and the locking is performed by an electrically powered mechanism (e.g., locking mechanism 1660 of FIG. 16).

In some embodiments, electric power is provided to, or received from electronics via connections made within the receiving port upon insertion of the accessory. For example, in some embodiments, a receiving port and accessory may include electrical terminals which engage each other when the accessory is secured to the port.

In some embodiments, an accessory is engaged with the receiving port, and is secured by means internal to the port, the vehicle, the accessory, or a combination thereof. When secured, the accessory may be disengaged by an electronic or mechanical system existing on, or enabled by, the vehicle. For example, if the accessory is secured using a visually identifiable method (e.g., a paddle or button), the accessory may be released by reversing the steps by which the accessory was secured.

In some embodiments, the present disclosure is directed to attachment ports integrated into a vehicle and arranged at multiple positions on the vehicle. For example, a user may desire to secure equipment to a cargo bed, roof, or other exterior area of a vehicle. In some embodiments, the present disclosure is directed to universal ports having similar interfaces for engagement (e.g., universal attachment ports). In some embodiments, the present disclosure is directed to different types of vehicle ports having suitable functionality (e.g., particular attachment ports).

FIG. 1 shows a perspective view of illustrative vehicle 100 that includes a plurality of attachment ports 110-121, in accordance with some embodiments of the present disclosure. While shown as an illustrative truck, the present disclosure may be applied to any suitable vehicle including a car, truck, van, bus, sport utility vehicle, crossover, service vehicle, construction vehicle, motorcycle, three-wheel motorcycle, or any other suitable vehicle to which equipment may be mounted. Attachment ports 110-119 are distributed around the outside of vehicle 100. For example, attachment ports 110-113 and 118-121 are arranged near cargo area 101 (i.e., a truck bed as illustrated). In a further example, attachment ports 114-117 are arranged on roof 102. In some embodiments, attachment ports 110-121 are similar in size, shape, function, and capability. In some embodiments, one or more, or all, of attachment ports 110-121 may be different from one another, having a different size, shape, function, capability, or a combination thereof.

Figure 2:
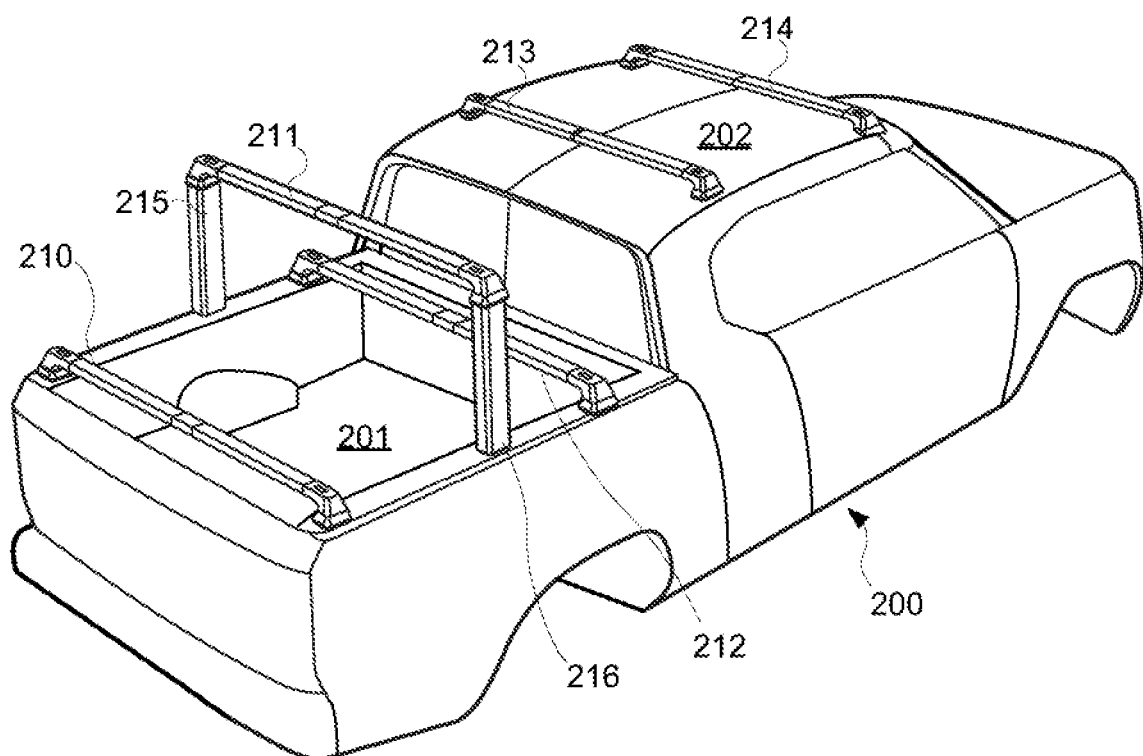
FIG. 2 shows a perspective view of an illustrative vehicle with accessories attached to a plurality of attachment ports, in accordance with some embodiments of the present disclosure.

FIG. 2 shows a perspective view of illustrative vehicle 200 with accessories 210-216 attached to a plurality of attachment ports, in accordance with some embodiments of the present disclosure. Accessories 210, 211, 212, 213, and 214 include crossbars, while accessories 215 and 216 include towers. Accessories 210 and 212-214 are coupled directly to attachment ports of vehicle 200. Accessory 211 is coupled to attachment ports of towers (e.g., accessories 215 and 216), which in turn are coupled to attachment ports of vehicle 200. Towers may be used to, for example, change the height of a crossbar (e.g., so that accessory 211 is at the same height as crossbars 213 and 214).

Figure 3:
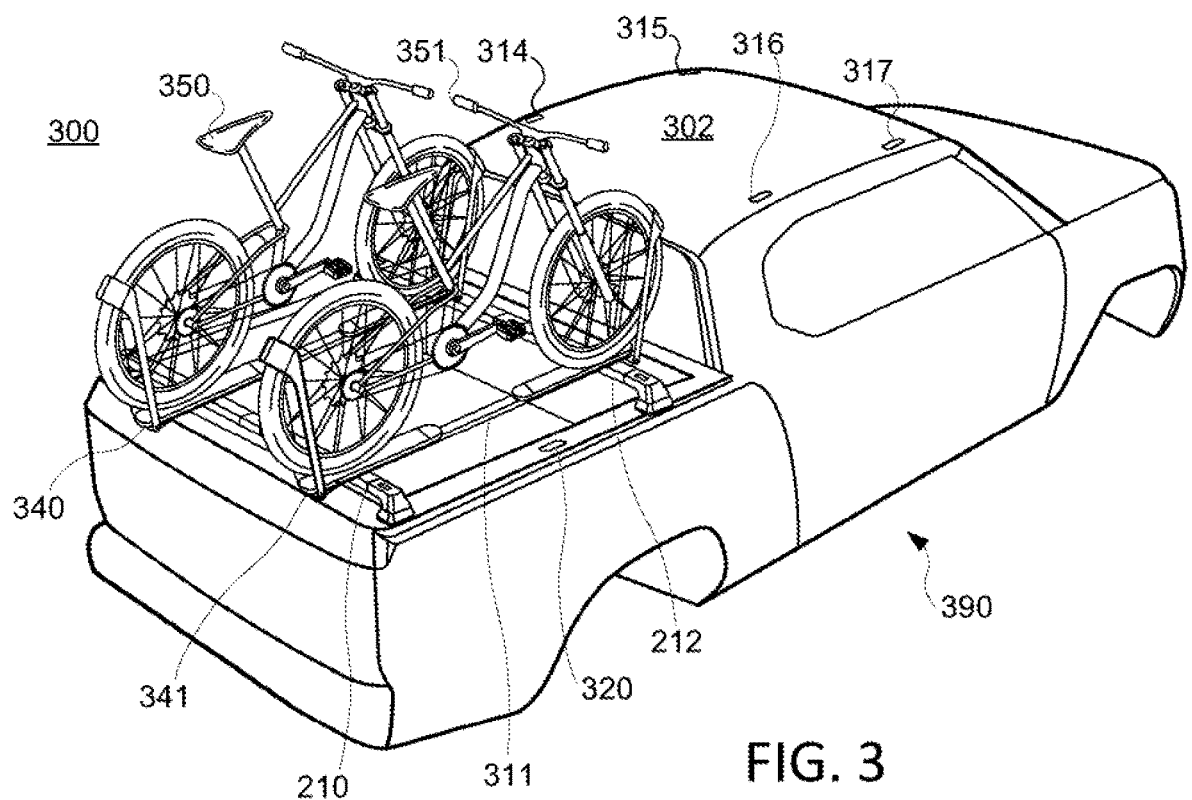
FIG. 3 shows a perspective view of an illustrative vehicle with an illustrative accessory configuration, in accordance with some embodiments of the present disclosure.

FIG. 3 shows a perspective view of illustrative vehicle 300 with illustrative accessory configuration 390, in accordance with some embodiments of the present disclosure. In illustrative accessory configuration 390, cross bar 210 is attached to a first pair of attachment ports, and cross bar 212 is attached to a second pair of attachment ports. Bike rack bars 340 and 341, configured to mount bicycles 350 and 351, respectively, are attached to cross bars 210 and 212. Accessory configuration 390 may be used for, for example, mounting bicycles above a cargo area of vehicle 300. Vehicle 300 also includes attachments ports 314, 315, 316, 317, and 320, unused in configuration 390, to which accessories may be mounted.

Figure 4:
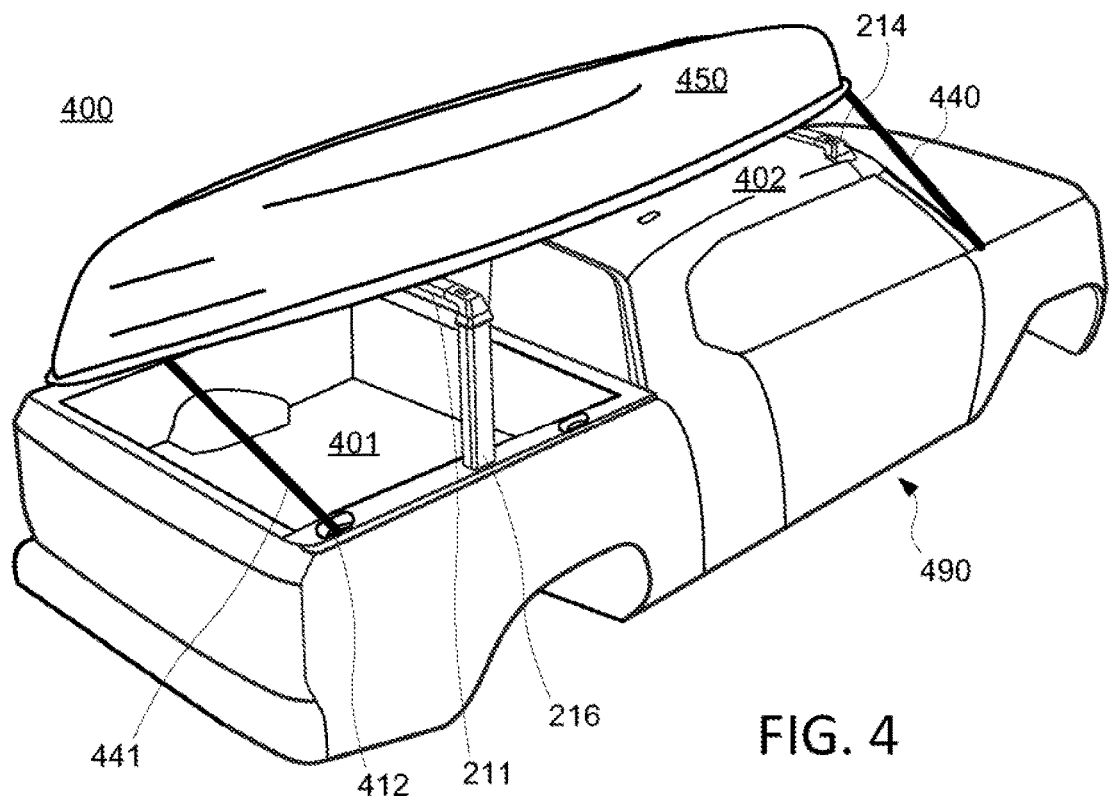
FIG. 4 shows a perspective view of an illustrative vehicle with an illustrative accessory configuration, in accordance with some embodiments of the present disclosure.

FIG. 4 shows a perspective view of illustrative vehicle 400 with illustrative accessory configuration 490, in accordance with some embodiments of the present disclosure. In illustrative accessory configuration 490, accessory 214 is attached to a first pair of attachment ports and accessory 211 is attached to accessory 216 (e.g., and another accessory on the other side of vehicle 400, but not visible in FIG. 4), which are in turn attached to a second pair of attachment ports. Tie-down 441 is attached to features of respective attachment port 412 and another attachment port on the opposite side of bed 401 (e.g., not visible in FIG. 4). Tie-down 440 is attached to one or more non-attachment port anchoring points. Accessory configuration 490 may be used for, for example, mounting canoe 450 over roof 402 and cargo area 401 of vehicle 400.

Figure 5:
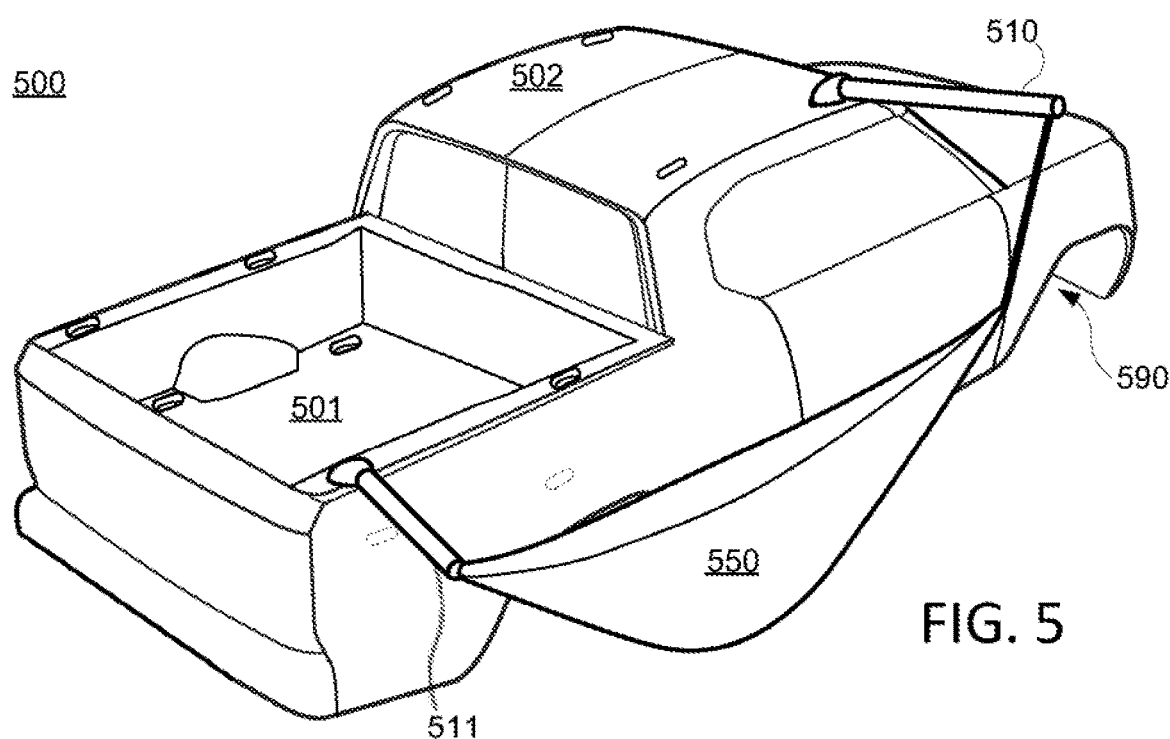
FIG. 5 shows a perspective view of an illustrative vehicle with an illustrative accessory configuration, in accordance with some embodiments of the present disclosure.

FIG. 5 shows a perspective view of illustrative vehicle 500 with illustrative accessory configuration 590, in accordance with some embodiments of the present disclosure. In illustrative configuration 590, accessories 510 and 511 are attached to respective attachment ports of vehicle 500. Accessories 510 and 511 include attachment arms, which are each configured to attach to a single attachment port, and may be used to act as a post, cantilever, mounting arm, or other beam configuration. For example, as illustrative shown in FIG. 5, accessories 510 and 511 are used to mount hammock 550, which is arranged to one side of vehicle 500. Further, accessories 510 and 511 are cantilevered from vehicle 500, to provide clearance for hammock 550. Accordingly, the attachments ports engaged with respective accessories 510 and 511 react corresponding loads (e.g., as illustrated, more than a person's bodyweight on hammock 550). In some embodiments, accessories 510 and 511 may include adjustable lengths (e.g., telescopic construction), one or more swivel joints (e.g., to allow accessories 510 and 511 to rotate about one or more axes), one or more mounting features (e.g., hooks, D-rings, carabiners, threaded holes, studs, or any other suitable features), or a combination thereof. In some embodiments, the present disclosure is directed to accessories that mount to a single attachment port, a single side of a vehicle, or both. For example, configuration 590 shows accessories 510 and 511 each mounted to a single, respective attachment port.

Figure 6:
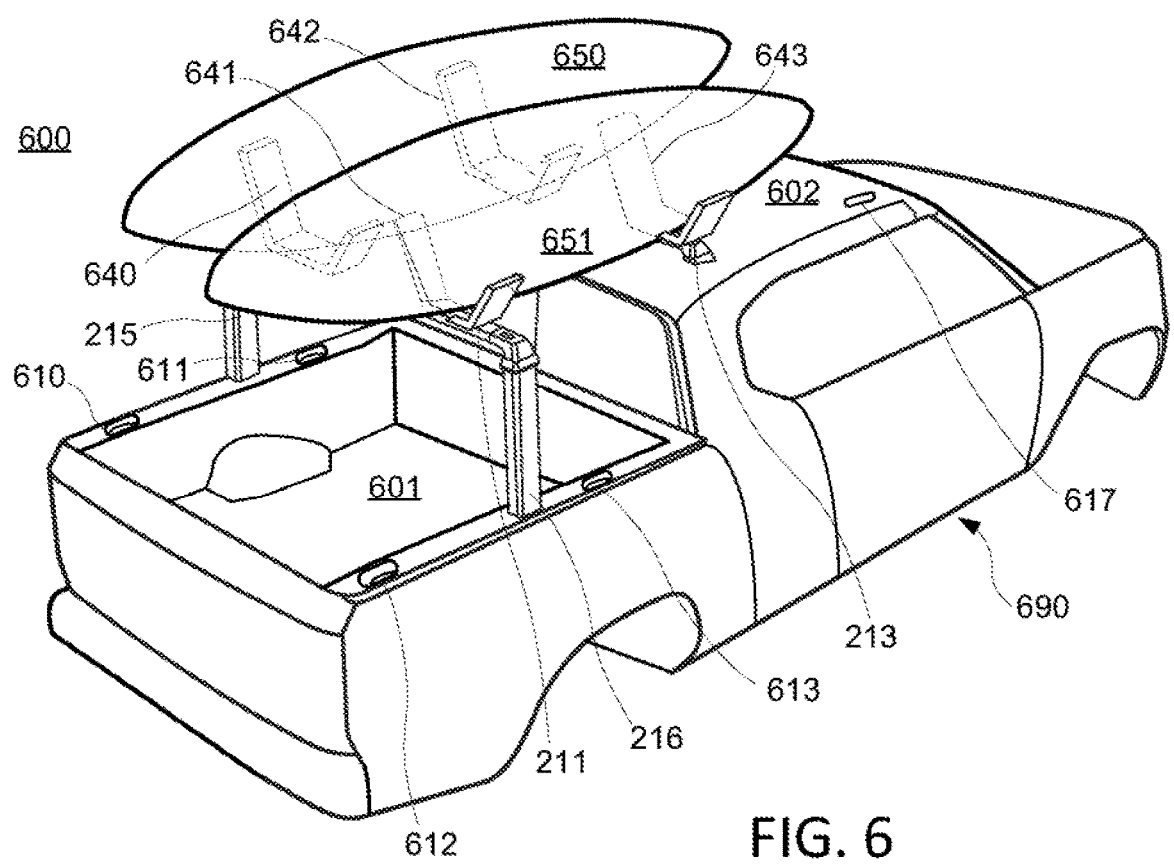
FIG. 6 shows a perspective view of an illustrative vehicle with an illustrative accessory configuration, in accordance with some embodiments of the present disclosure.

FIG. 6 shows a perspective view of illustrative vehicle 600 with illustrative accessory configuration 690, in accordance with some embodiments of the present disclosure. In illustrative accessory configuration 690, accessory 213 is attached to a first pair of attachment ports, and accessory 211 is attached to accessories 215 and 216, which are in turn attached to a second pair of attachment ports. Accessories 640 and 641 are mounted to accessory 211, and accessories 642 and 643 are mounted to accessory 213, and are configured to secure equipment (e.g., kayaks 650 and 651 as shown in FIG. 6). Accessory configuration 690 may be used for, for example, mounting kayaks 650 and 651 across roof 602 and cargo area 601 of vehicle 600. In some embodiments, accessories 640-643 include adjustable lengths (e.g., telescopic construction), one or more swivel joints, one or more mounting features (e.g., hooks, D-rings, carabiners, threaded holes, studs, or any other suitable features), or a combination thereof. Vehicle 600 also includes attachments ports 610, 611, 612, 613, and 617, unused in configuration 690, to which accessories may be mounted.

Figure 7:
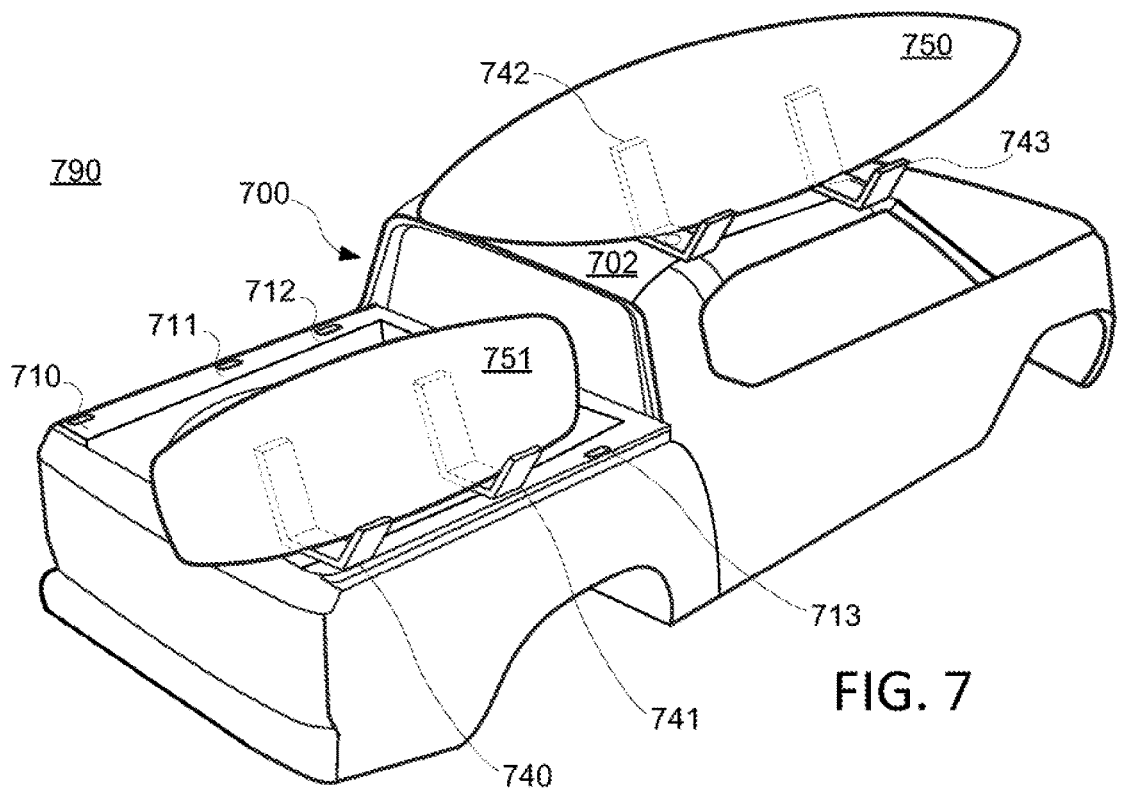
FIG. 7 shows a perspective view of an illustrative vehicle with an illustrative accessory configuration, in accordance with some embodiments of the present disclosure.

FIG. 7 shows a perspective view of illustrative vehicle 700 with illustrative accessory configuration 790, in accordance with some embodiments of the present disclosure. In illustrative accessory configuration 790, accessories 740, 741, 742, and 743 are each attached to respective attachment ports. Accessories 740-743 include U-shaped blocks each configured to mount to a single attachment port. Accessory configuration 790 may be used for, for example, mounting kayak 750 along roof 702 and storage container 751 near a cargo area of vehicle 700. Vehicle 700 also includes attachments ports 710, 711, 712, and 713, unused in configuration 790, to which accessories may be mounted.

Figure 8:
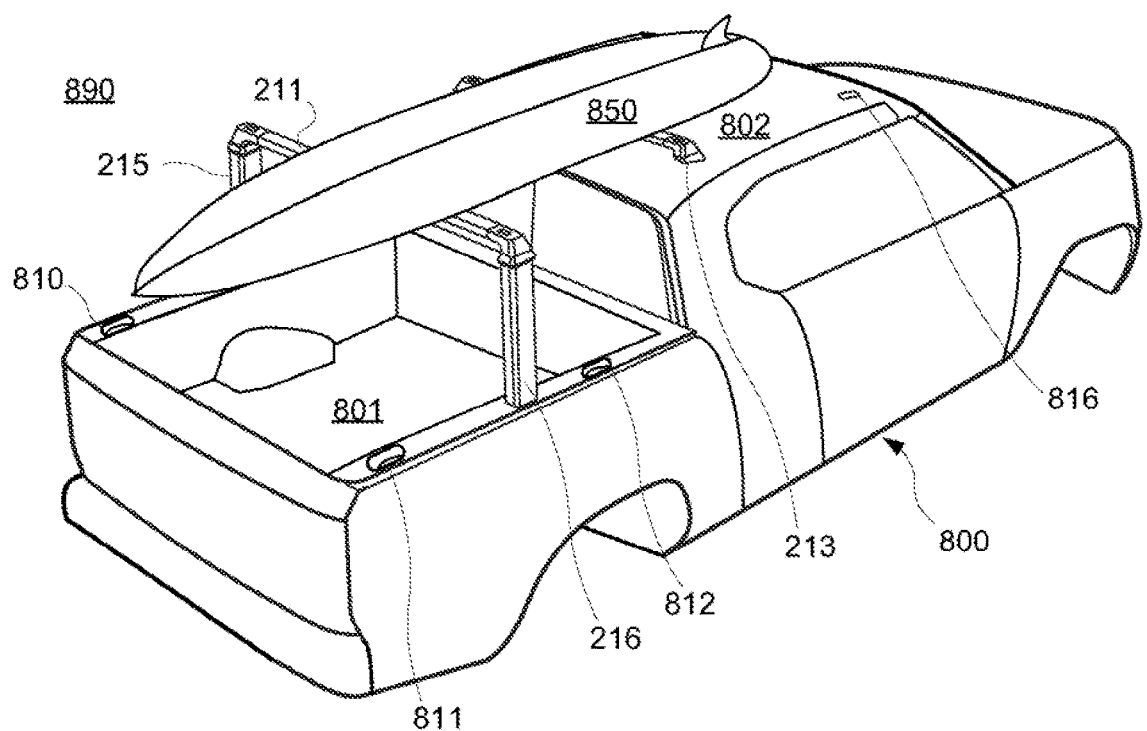
FIG. 8 shows a perspective view of an illustrative vehicle with an illustrative accessory configuration, in accordance with some embodiments of the present disclosure.

FIG. 8 shows a perspective view of illustrative vehicle 800 with illustrative accessory configuration 890, in accordance with some embodiments of the present disclosure. In illustrative accessory configuration 890, accessory 213 is attached to a first pair of attachment ports, and accessory 211 is attached to accessories 215 and 216, which are in turn attached to a second pair of attachment ports. Accessory configuration 890 may be used for, for example, mounting surfboard 850 across roof 802 and cargo area 801 of vehicle 800. In a further example, configuration 890 may be useful for mounting equipment that is longer than either roof 802, cargo area 801, or both, by extending the availing mounting area (e.g., to mount the equipment above roof 802 and cargo area 801). Vehicle 800 also includes attachments ports 810, 811, 812, and 816, unused in configuration 890, to which accessories may be mounted.

Any of illustrative configurations 390-890 of FIGS. 3-8 may be combined, or otherwise modified, in accordance with the present disclosure. For example, a user may attach accessories to any of attachment ports 110-121, in any suitable configuration, to mount any suitable equipment. In a further example, there may exist more than one configuration to mount any particular equipment. In a still further example, any particular configuration may be used to mount any suitable equipment. A vehicle may include any suitable number of attachment ports, arranged on a roof surface, cargo bed, cargo bed rail, fender, quarter panel, any other suitable portion of an outer surface, or any suitable combination thereof.

Attachment ports and plugs may engage using any suitable interface, in accordance with the present disclosure. In some embodiments, the interface is mechanical and includes, for example, latches, pins, cams, any other suitable components, or any combination thereof. In some embodiments, the interface includes electromechanical actuators configured to aid in securing or locking the interface. FIGS. 9-12 show illustrative attachment ports and plugs, in accordance with some embodiments of the present disclosure. The illustrative ports and plugs of FIGS. 9-12 provide examples, and any suitable interface between a port and a plug may be used, in accordance with some embodiments of the present disclosure.

Figure 9:
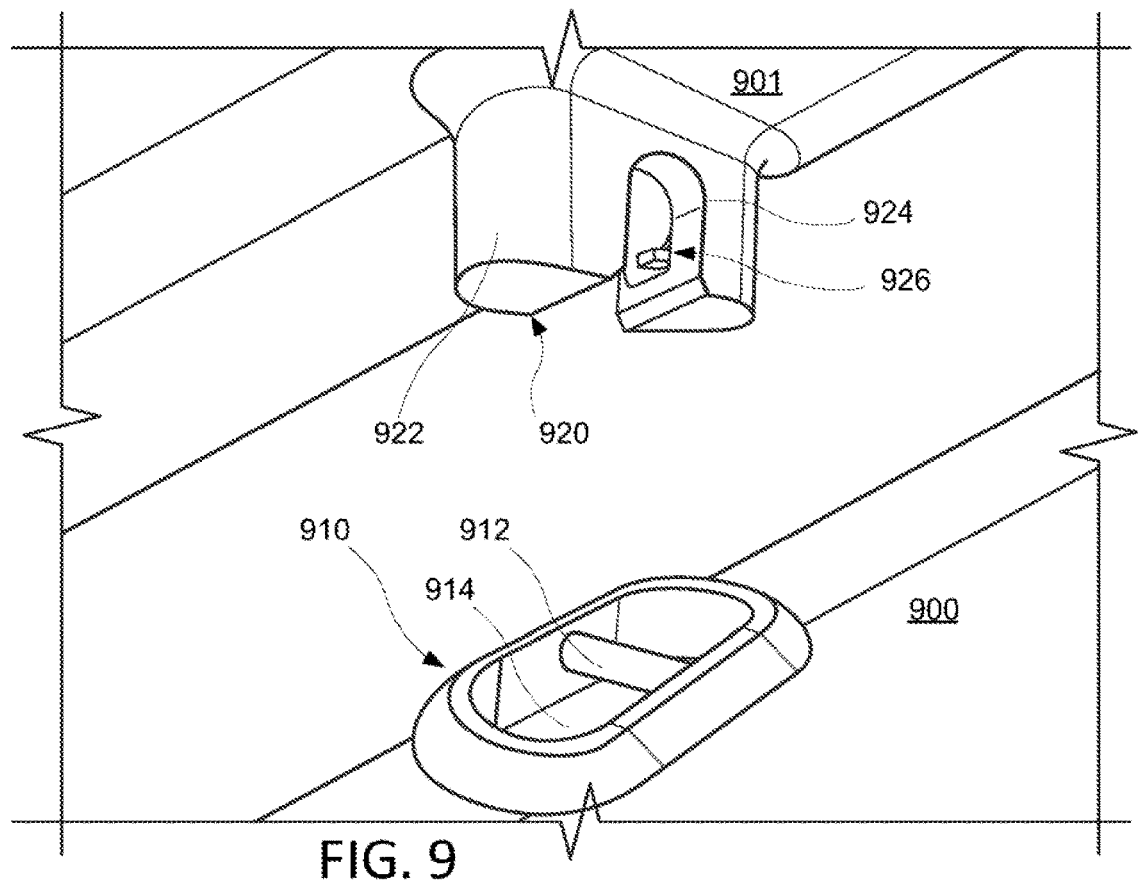
FIG. 9 shows a perspective view of an illustrative attachment port and a corresponding attachment plug, in a disengaged state, in accordance with some embodiments of the present disclosure.

FIG. 9 shows a perspective view of illustrative attachment port 910 and a corresponding attachment plug 920, in a disengaged state, in accordance with some embodiments of the present disclosure. Illustrative attachment port 910 includes pin 912 and recess 914. Illustrative attachment plug 920 includes plug body 922, recess 924, and latching mechanism 926. Accessory 901 may include one or more attachment plugs including attachment plug 920. Vehicle 900 includes attachment port 910 and may include one or more other attachment ports arranged at suitable locations.

Figure 10:
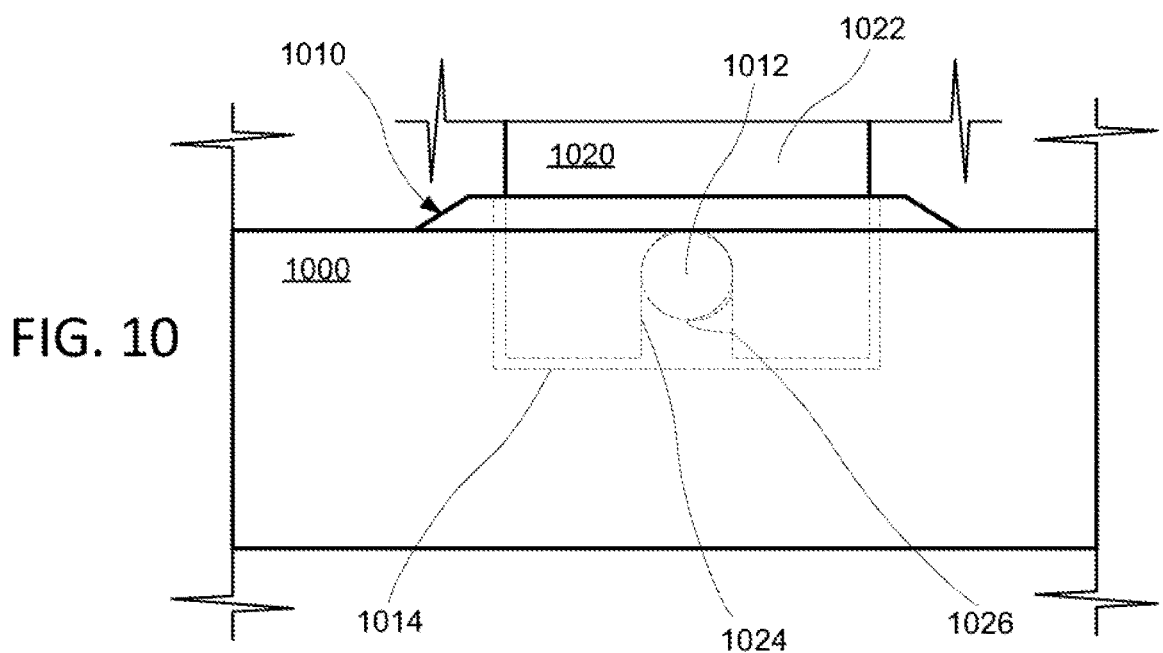
FIG. 10 shows a side view of an illustrative attachment port and corresponding attachment plug in an engaged state, in accordance with some embodiments of the present disclosure.

FIG. 10 shows a side view of illustrative attachment port 1010 and corresponding attachment plug 1020 in an engaged state, in accordance with some embodiments of the present disclosure. For example, when engaged, plug body 1022 is arranged in recess 1014, and pin 1012 is arranged in recess 1024 and secured by latch 1026. In the engaged state illustrated in FIG. 10, latch 1026 holds pin 1012 and recess 1024 in a stable relative position (e.g., pin 1012 cannot slide appreciably along recess 1024).

Although recess 1014 is illustrated as being included in attachment port 1010, the port and plug geometry may be reversed, in some embodiments. For example, an attachment port may include a body which protrudes and includes a first recess. A corresponding plug may include a second recess into which the body fits, as well as a pin which is configured to engage with the first recess.

Figure 11:
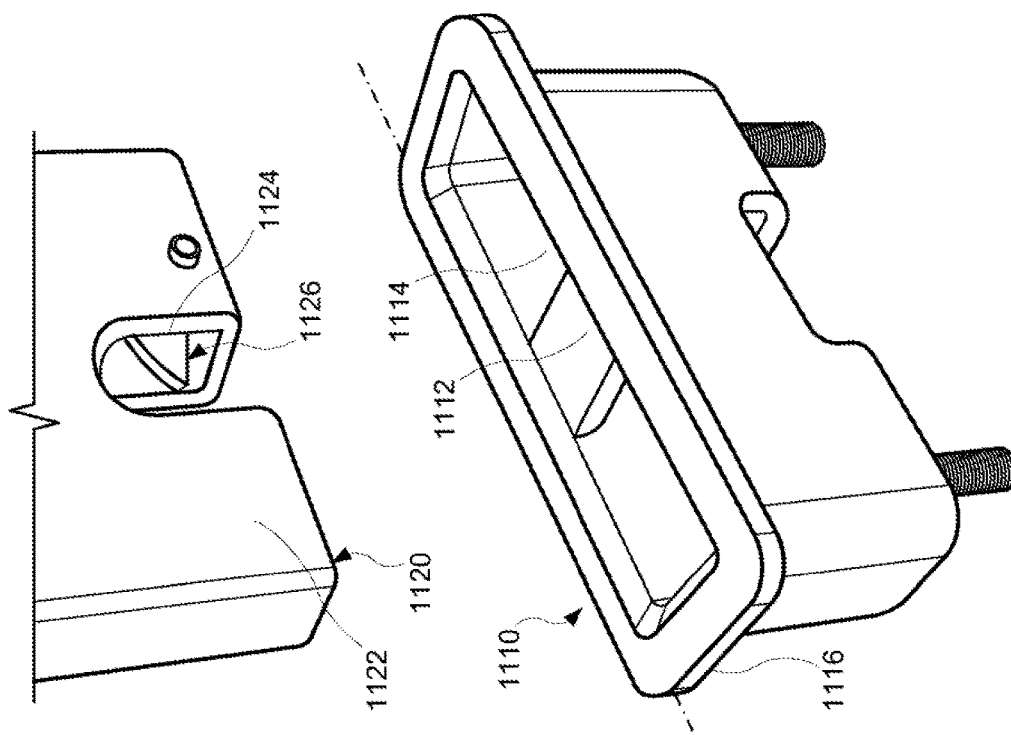
FIG. 11 shows a perspective view of an illustrative attachment port and a corresponding attachment plug, in a disengaged state, in accordance with some embodiments of the present disclosure.

FIG. 11 shows a perspective view of illustrative attachment port 1110 and corresponding attachment plug 1120, in a disengaged state, in accordance with some embodiments of the present disclosure. Illustrative attachment port 1110 includes pin 1112, recess 1114, and rim 1116. Illustrative attachment plug 1120 includes plug body 1122, recess 1124, and latching mechanism 1126. Attachment plug 1120 is part of an accessory, which may in turn include other attachment plugs. Attachment port 1110 is shaped as a rounded quadrilateral in cross-section (e.g., in the plane of the outer surface of the vehicle, or suitably parallel planes), with a depth configured to accommodate attachment plug 1120. Latching mechanism 1126 includes a cam mechanism, which may be spring loaded, to act as a capture for pin 1112.

Figure 12:
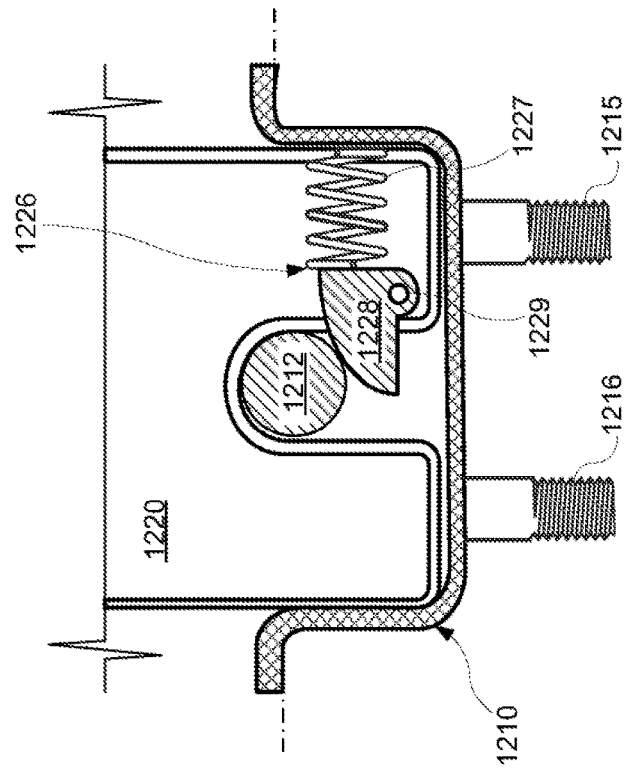
FIG. 12 shows a side view of an illustrative attachment port and corresponding attachment plug in an engaged state, in accordance with some embodiments of the present disclosure.

FIG. 12 shows a side view of illustrative attachment port 1210 and corresponding attachment plug 1220 in an engaged state, in accordance with some embodiments of the present disclosure. Attachment plug 1220 is engaged with attachment port 1210. In the engaged state, spring 1227 is compressed shorter than its neutral length (e.g., the length at which there is no spring force), and accordingly applies a force on catch 1228 in the counter-clockwise direction about hinge-pin 1229, as illustrated in FIG. 12. Latching mechanism 1226 includes spring 1227 configured to hold catch 1228 in place by applying a moment about hinge-pin 1229. Attachment port 1210 includes fasteners 1215 and 1216, which are configured to be secured to a vehicle, thus positioning attachment port 1210 at an outer surface of the vehicle.

In some embodiments, there are two stages of retaining an attachment plug within an attachment port. A first stage includes preliminary engagement in which a relatively mild form of retention holds the accessory in place but not locked. For example, the first stage may keep the accessory from falling out of the port in any orientation due to gravity acting upon the accessory in a direction making it most vulnerable to disengagement. A second stage includes locking the engagement (e.g., using a manual or electrically powered mechanism) such that the accessory cannot be physically removed without damaging the vehicle, the port, the accessory, or a combination thereof. Further, the first and second stages can be performed in reverse when disengaging the accessory from the attachment port. The second stage is released and the accessory is unlocked, but is still held in place with the mild form of retention described previously as the first stage. The first stage can then be released (e.g., the user exerts force on the interface) to remove the accessory from the attachment port.

Figure 13:
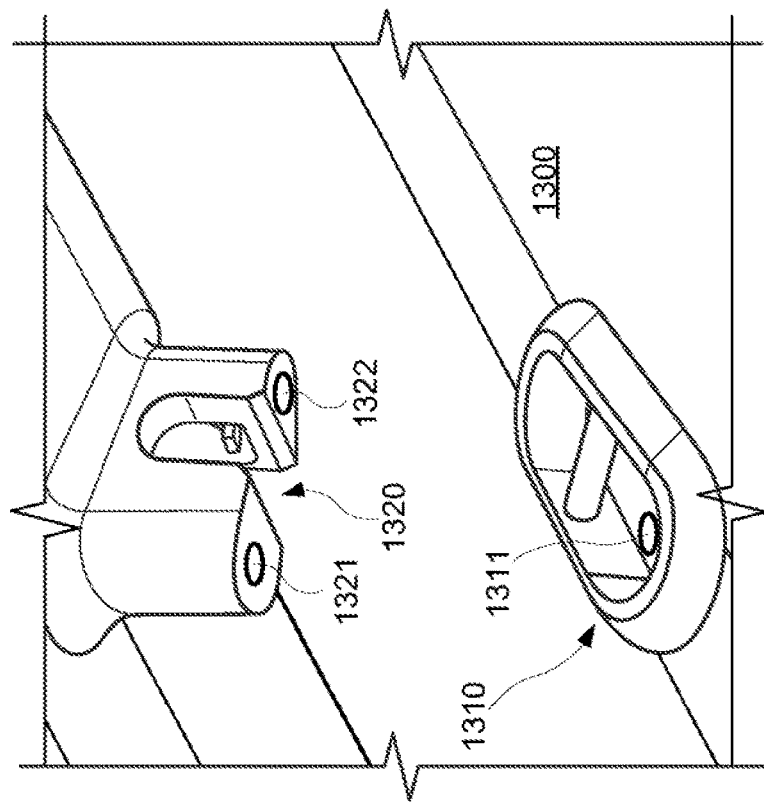
FIG. 13 shows a perspective view of an illustrative attachment port and a corresponding attachment plug having electrical terminals, in a disengaged state, in accordance with some embodiments of the present disclosure.

FIG. 13 shows a perspective view of illustrative attachment port 1310 and corresponding attachment plug 1320 having electrical terminals 1321 and 1322, in a disengaged state, in accordance with some embodiments of the present disclosure. For example, attachment plug 1320 and attachment port 1310 are illustrated as geometrically similar to attachment plug 920 and attachment port 910, respectively, of FIG. 9. Illustrative attachment port 1310 includes electrical terminal 1311, which is electrically coupled to control circuitry. Illustrative attachment plug 1320 includes electrical terminals 1321 and 1322. Electrical terminal 1321 is configured to contact electrical terminal 1311 when attachment plug 1320 is fully engaged to attachment port 1310. Electrical terminal 1322 is configured to contact a second electrical terminal (e.g., not shown, blocked by the pin) when attachment plug 1320 is fully engaged to attachment port 1310. The control circuitry may be configured to detect when attachment plug 1320 is engaged/disengaged based on electrical signals measured from electrical terminal 1311. In some embodiments, more than one electrical terminal of an attachment plug may contact corresponding electrical terminals of an attachment port. For example, the use of two electrical contacts may allow a circuit to be completed, thus providing electrical feedback of engagement/disengagement. In some embodiments, vehicle 1300 may include a plurality of attachment ports, for which at least one port includes one or more electrical terminals. For example, in some embodiments, all attachments port of a vehicle may include one or more electrical terminals coupled to control circuitry. In a further example, in some embodiments, a subset of attachments port of a vehicle may include one or more electrical terminals coupled to control circuitry.

Figure 14:
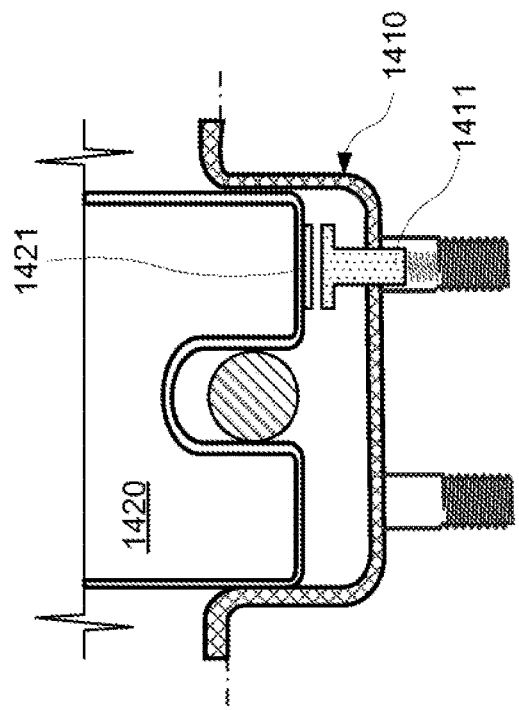
FIG. 14 shows a side cross-sectional view of an illustrative attachment port and corresponding attachment plug in a partially engaged state, in accordance with some embodiments of the present disclosure.

FIG. 14 shows a side cross-sectional view of illustrative attachment port 1410 and corresponding attachment plug 1420 in a partially engaged state, in accordance with some embodiments of the present disclosure. Attachment port 1410 includes switch 1411 (e.g., spring-loaded as illustrated), which may be configured to open or close a circuit path of the control circuitry. Attachment plug 1420 includes contact 1421 configured to apply a force on switch 1411 to cause switch 1411 to change throw position as attachment plug 1420 is engaged/disengaged from attachment port 1410. Switch 1411 may include any suitable type of switch which may be coupled to control circuitry.

Figure 15:
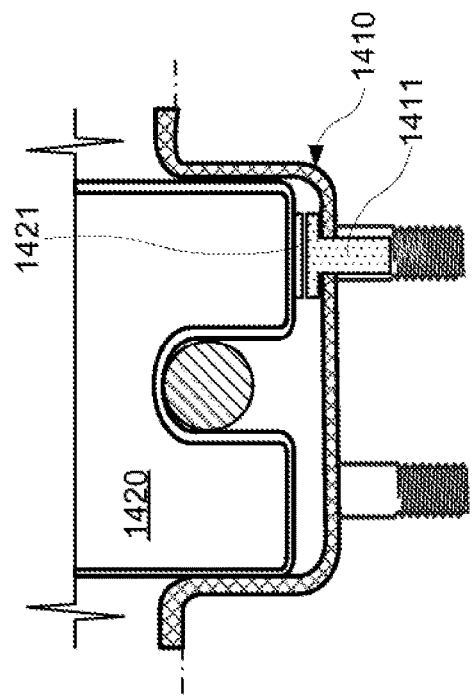
FIG. 15 shows a side cross-sectional view of the illustrative attachment port and corresponding attachment plug of FIG. 14 in a fully engaged state, in accordance with some embodiments of the present disclosure.

FIG. 15 shows a side cross-sectional view of illustrative attachment port 1410 and corresponding attachment plug 1420 of FIG. 14 in a fully engaged state, in accordance with some embodiments of the present disclosure. In some embodiments, the control circuitry may determine which attachment ports have corresponding attachment plugs installed. In some embodiments, the engagement interface between an attachment plug and attachment port may include an identifier (e.g., an RFID tag, an electrical property), a plurality of electrical terminals, one or more electrical terminals configured to transfer electrical power (e.g., to an accessory having a light or control circuitry), or any combination thereof.

In some embodiments, the present disclosure is directed to different types of vehicle ports having suitable functionality. In some embodiments, the present disclosure is directed to accessories having different types of plugs, and corresponding functionalities. For example, a vehicle may include a plurality of attachment ports, and a subset of the attachment ports may be configured for heavier duty (e.g., capable of accommodating larger forces and moments). In a further example, a vehicle may include a plurality of attachment ports, and a subset of the attachment ports may be configured for lighter duty (e.g., capable of accommodating smaller forces and moments, but more easily secured). In a further example, a vehicle may include a plurality of attachment ports, and a subset of the attachment ports may include electrical terminals (e.g., capable of transmitting power, communications signals, or both).

In some embodiments, a vehicle may include several variations of the port design. For example, the vehicle may include "light-duty ports" configured for use with full cross bars (e.g., such that the loads are distributed among two or more ports, and are relatively balanced), and "heavy-duty ports" configured for use with half cross bars or dedicated single port accessories (e.g., which may experience full loading, or imbalanced loading). In an illustrative example, the interface may include a lock-out feature preventing heavy-duty plugs from engaging with light-duty ports, but allowing light-duty plugs to engage with either light-duty or heavy-duty ports. In some embodiments, for example, a heavy-duty attachment plug and a heavy-duty attachment port may be longer than corresponding light-duty attachment ports and plugs. Accordingly, a light-duty attachment plug may engage with a heavy-duty port, but a heavy-duty attachment plug will not engage with a light-duty attachment port.

In some embodiments, a light-duty port is configured to engage with accessories such as, for example, a crossbar having two plugs, a D-rings, a truck cap, a foam block, a tie down strap, any other suitable accessory, or any combination thereof. In some embodiments, a heavy-duty port is configured to engage with accessories such as, for example, a crossbar having a single plug (e.g., configured to carry load as a cantilever), an equipment mount (e.g., for a kayak, a bike, skis, a snowboard, a hammock), a D-ring, a tie-down strap, a truck cap, any other suitable accessory, or any combination thereof.

In some embodiments, ports of different types may include respective features to limit the inter-connecting of attachment plugs and attachment ports of different types. In some embodiments, a first attachment port includes a first shape and a second attachment port includes a second port shape different from the first shape. In some embodiments, attachment ports of different types include respective capacities to support different loads. In some embodiment, a first attachment plug is capable of being inserted into both a first attachment port and a second attachment port, of different types. In some such embodiments, the second attachment plug is not capable of being inserted into the first attachment port. In some embodiments, a first attachment port is designed for light loads and a second attachment port is designed for heavy loads. In some embodiments, an attachment plug may include a protrusion and a type of attachment port includes an indentation to accommodate the protrusion. In some such embodiments, other types of attachment ports do not include an indentation or are otherwise not shaped to accommodate the protrusion of the attachment plug.

In addition to the weight or loading classification, the ability to transfer power to or from an accessory, or lack thereof, may correspond to a classification. For example, in some embodiments, a type of attachment port may be configured to transfer power to or from an accessory. For example, the attachment port may include two electrical terminals (e.g., configured for ground and 12 VDC), which are coupled to control circuitry of a vehicle. The control circuitry may be configured to provide charging power to the accessory, receive charging power from the accessory, provide power to the accessory to power an auxiliary function, or a combination thereof. Some illustrative accessories that may provide or receive power include, for example, a cook station, a shower (e.g., including a water pump), a wheel lift (e.g., a jack), a winch, a power adapter (e.g., to provide 110 VAC or other output), a computer station, lighting, a fan, a solar panel, a cooler (e.g., a refrigerator), a generator (e.g., a portable gasoline generator), a security cable, any other suitable accessory, or any combination thereof. In some embodiments, a port having electrical functionality may include a lock-out configured to prevent engagement with an accessory not having electrical terminals (e.g., a non-powered accessory). In some embodiments, plugs and ports having different functionality may be allowed to engage with each other, regardless of whether the port and plug have the same functionality or classification.

In some embodiments, the present disclosure is directed to different types of vehicle ports having suitable functionality.

Figure 16:
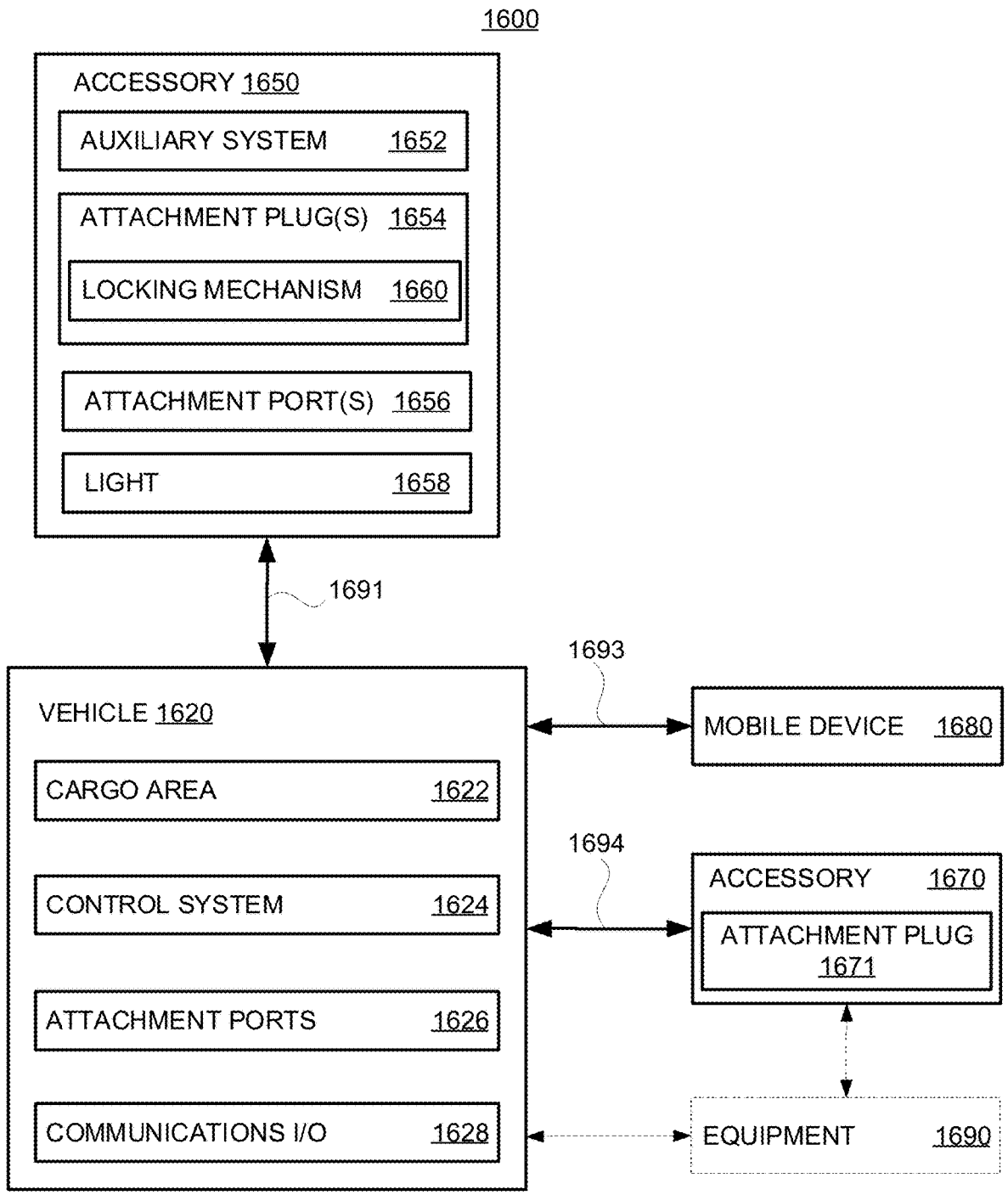
FIG. 16 shows a block diagram of an illustrative arrangement including a vehicle, two illustrative accessories, a mobile device, and illustrative equipment, in accordance with some embodiments of the present disclosure.

FIG. 16 shows a block diagram of illustrative arrangement 1600 including vehicle 1620, illustrative accessories 1650 and 1670, mobile device 1680, and illustrative equipment 1690, in accordance with some embodiments of the present disclosure.

Vehicle 1620 includes cargo area 1622, control system 1624, attachment ports 1626, and communications I/O 1628. Cargo area 1622 may include a truck bed, a trunk, a storage area, a roof, any other suitable area of a vehicle, or any combination thereof. Control system 1624 may be integrated into the vehicle's primary control system, included as a stand-alone unit installed in the vehicle (e.g., and optionally powered by the vehicle), or a combination thereof (e.g., an after-market system that is installed integral to the vehicle). Attachment ports 1626 include ports configured to engage attachment plugs 1654 or 1671. In some embodiments, attachment ports 1626 include one or more electrical terminals configured to electrically contact electrical terminals of an attachment plug. Communication I/O 1628 is optionally included to communicate with optional mobile device 1680, optional accessory 1650, optional accessory 1670, or a combination thereof, for example. In some embodiments, communications I/O 1628 may include Internet connectivity, and accordingly may interact with a web application.

Optional accessory 1650 includes auxiliary system 1652 (e.g., that may include processing equipment and communications I/O) and attachment plugs 1654. In some embodiments, accessory 1650 is configured to communicate with vehicle 1620 via communications link 1691. In some embodiments, accessory 1650 is configured to communicate with mobile device 1680 via communications links 1691 and 1693. Auxiliary system 1652 may be coupled to electrical terminals of one or more of attachment plugs 1654. Attachment plugs 1654 include plugs configured to engage an attachment port. Attachment ports 1654 may include one or more electrical terminals configured to electrically contact electrical terminals of an attachment port. Auxiliary system 1652 may include communication I/O configured to communicate with optional mobile device 1680, vehicle 1620, or both, for example. In some embodiments, accessory 1650 includes one or more attachment ports 1656, configured to engage with attachment plugs of other accessories, for example. In some embodiments, accessory 1650 includes a light (e.g., light 1658 of FIG. 16).

Optional mobile device 1680 is configured to communicate with accessory 1650, accessory 1670, vehicle 1620, or a combination thereof. In some embodiments, mobile device 1680 is configured to communicate with vehicle 1620 via communications link 1693. Mobile device 1680 may include, for example, a tablet computer, a smart phone, a key fob, a smart watch, another other suitable device, or any combination thereof. Communications link 1693 may include Bluetooth, WiFi, 3G, 4G, near-field communication (NFC), any other suitable communications link, or any combination thereof. In some embodiments, mobile device 1680 includes one or more software applications configured to provide information to, and receive information from, vehicle 1620.

Equipment 1690 may include any suitable equipment that may be secured to a vehicle, or to an accessory secured to the vehicle. For example, equipment 1690 may include bicycles, kayaks, surfboards, cargo containers, a hammock, a canoe, skis, any other suitable recreation equipment, any other suitable tool equipment, any other suitable storage equipment, or any combination thereof.

FIG. 17 shows a flowchart of illustrative process 1700 for securing an attachment plug, in accordance with some embodiments of the present disclosure. It should be noted that process 1700 or any step thereof could be performed by any of the illustrative systems shown in FIGS. 1-16. In addition, one or more steps of process 1700 may be incorporated into or combined with one or more steps of any other process or embodiment described herein. It is contemplated that the steps or descriptions of FIG. 17 may be used with any other embodiment of this disclosure. In addition, the steps and descriptions described in relation to FIG. 17 may be done in alternative orders or in parallel, in accordance with the present disclosure. Any of these steps may also be suitably skipped or omitted from performance of the process.

Step 1702 includes the control system detecting an attachment plug engaged to an attachment port. For example, the control system may apply a signal to an electrical terminal of an attachment port and may detect a signal at a second electrical terminal of the attachment port. The detected signal may include an attenuated, filtered, or otherwise modified vestige of the applied signal. For example, if a voltage or current is applied at one terminal, a relatively reduced voltage or current may be detected at the other end due to impedance of the cable. Accordingly, the control system may be configured to detect one or more features of an electrical signal. For example, the control system may be configured to detect a voltage above a threshold, a current above a threshold, a frequency component (e.g., from a spectrum-based calculation), a leading or trailing edge of a pulse, any other suitable feature, or any combination thereof. To illustrate, the control system may include an analog-to-digital converter (ADC), a comparator, or other suitable circuitry to detect a signal.

Step 1704 includes the control system determining attachment port information. In some embodiments, one or more electrical terminals may contact corresponding electrical terminals of a port only when the plug is fully seated, inserted, or otherwise connected. For example, the electrical terminals and corresponding electrical terminals may only line up and come in contact when the plug is fully inserted. In some embodiments, the control system determines whether the attachment plug is arranged for securement based on the detection at step 1702. For example, if no engagement is detected, the control system may determine that an attachment plug is not arranged for securement. In a further example, if an attachment plug is secured but damaged and no signal is detected, the control system may determine that the attachment plug is not arranged for securement. In a further example, if a signal is detected, but is noisy, intermittent, or too strongly attenuated, the control system may determine that the attachment plug is not arranged for securement. In a further example, if the control system detects a signal voltage above a predetermined threshold, then the control system may determine that the attachment plug is arranged for securement.

Step 1706 includes the control system identifying user information. In some embodiments, when the control system has determined that the attachment plug is arranged for securement, the control system requires user information before causing a latching mechanism to be secured (e.g., at step 1708). For example, a user may insert a plug into a suitable port and then secure items to an accessory. If the user is not authorized, the control system will not cause the latching mechanism to be secured. For example, this prevents an unauthorized stranger or nefarious actor from securing equipment (e.g., an inconvenience for the authorized user). In some embodiments, the control system may include a communications interface configured to communicate with a user's mobile device (e.g., a smart phone, or a key fob). For example, the control system may prompt the user for a code. In a further example, the mobile device may include a software application configured to communicate with the control system, and the user may send an authorization to the control system. In a further example, the mobile device may include a key fob (e.g., the vehicle car alarm key fob), which may be recognized by the control system when in proximity, and the control system may accordingly identify the user. In some embodiments, the vehicle may include a keypad, touchscreen, or other user interface on the interior or exterior coupled to the control system. Accordingly, the control system may use the interface (e.g., via a software application, or use of push buttons) to prompt the user for authorization or identification.

Step 1708 includes the control system causing a latching mechanism to be secured. The control system may perform step 1708 in response to identifying user information at step 1706. For example, the control system may identify a nearby key fob, determine that the key fob is authorized, and then perform step 1708. In some embodiments, causing the latching mechanism to be secured includes, for example, applying voltage to a relay, closing an electrical circuit, generating a signal, applying electrical power to the latching mechanism, any other action which secures the latching mechanism, or any combination thereof.

Step 1710 includes the control system monitoring the engagement of the attachment plug and attachment port. In some embodiments, step 1710 includes the control system determining if the attachment plug and attachment port become disengaged. For example, the control system may perform step 1710 at a frequency, time interval, in response to a signal, at any other time schedule, or a combination thereof.

FIG. 18 shows a flowchart of illustrative process 1800 for releasing an attachment plug, in accordance with some embodiments of the present disclosure. It should be noted that process 1800 or any step thereof could be performed by any of the illustrative systems shown in FIGS. 1-16. In addition, one or more steps of process 1800 may be incorporated into or combined with one or more steps of any other process or embodiment described herein. It is contemplated that the steps or descriptions of FIG. 18 may be used with any other embodiment of this disclosure. In addition, the steps and descriptions described in relation to FIG. 18 may be done in alternative orders or in parallel, in accordance with the present disclosure. Any of these steps may also be suitably skipped or omitted from performance of the process. In some embodiments, process 1800 includes step 1710 from FIG. 17, but process 1800 need not include step 1710 from FIG. 17.

Step 1804 includes a control system receiving an indication to disengage an attachment plug from an attachment port. For example, the control system may perform step 1804 when equipment is already secured. In some embodiments, the control system may receive a user indication to release the attachment plug. For example, a user may provide the indication to release the attachment plug via a software application of a mobile device in communication with the control system. In some embodiments, the vehicle may include a keypad, touchscreen, a button, or other user interface on the interior or exterior coupled to the control system. The control system may receive the indication via the interface from the user.

Step 1806 includes the control system determining whether the user indication is authorized based on user information. In some embodiments, the control system identifies the user based on a code, a RFID tag (e.g., of a key fob, or other device), location of the user (e.g., relative to the vehicle), any other suitable criterion, or any combination thereof. In some embodiments, step 1806 may be combined with step 1804. For example, the software application on the user's mobile device may determine authorization before sending the indication to the control system. In some embodiments, step 1806 includes the control system determining that the user indication is not authorized (e.g., the user is not identifiable, or is identified but unauthorized), and not proceeding to step 1808.

Step 1808 includes the control system causing the latching mechanism to be released, if it is determined at step 1806 that the user indication is authorized. The control system may perform step 1808 in response to step 1806. For example, the control system may receive a user indication from a nearby key fob, determine that the indication is authorized, and then perform step 1808. In some embodiments, causing the latching mechanism to be released includes, for example, applying voltage to a relay, closing an electrical circuit, generating a signal, applying electrical power to the latching mechanism, any other action that releases the latching mechanism, or any combination thereof.

It should be noted that any of the devices or systems discussed in relation to FIGS. 1-16 may be used to perform one or more of the steps in illustrative processes 1700-1800 in FIGS. 17-18, respectively. Furthermore, it should be noted that the features and limitations described in any one embodiment may be applied to any other embodiment herein, and flowcharts or examples relating to one embodiment may be combined with any other embodiment in a suitable manner, done in different orders, performed with addition steps, performed with omitted steps, or done in parallel.

Some of the illustrative steps of processes 1700 and 1800 need not be included or may be performed manually. For example, a user may manually secure an attachment plug to an attachment port and then the system monitors the connection. In a further example, a user may manually release an attachment plug from an attachment port. In some such examples, the vehicle (e.g., control circuitry thereof) may be configured to monitor whether something (e.g., an accessory) is attached to an attachment port and also may be configured to notify the vehicle owner or provide an indication on an instrument panel or transmit an indication to a mobile device. In some embodiments, an attachment port, attachment plug, or both, may include a manual lock to prevent unauthorized removal. For example, the attachment port may include a hatch that blocks a release button and the hatch may be manually locked by the user.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A vehicle having an integrated connector system, comprising:
    a vehicle body comprising an outer surface;
    a plurality of attachment ports arranged on the outer surface, wherein each of the plurality of attachment ports comprises:
        a recess that extends below the surrounding outer surface and is configured to accommodate an attachment plug of an accessory, wherein:
            the attachment plug comprises a body comprising a pair of rigid extensions forming a notch therebetween that accommodates a pin such that when the attachment plug is inserted into the port, the pin passes into the notch between the pair of rigid extensions and ends of the pair of rigid extensions come to rest below the outer surface in the recess;
            the recess comprises two opposing sidewalls that comprise corresponding portions that extend below a height of the surrounding outer surface;
            each respective recess comprises a perimeter comprising two parallel sides, each comprising portions of the two opposing side walls, a first curved end that connects first ends of the respective two parallel sides, and a second curved end that connects second ends of the respective two parallel sides; and
        the pin extending between the two opposing sidewalls of the recess, wherein the pin comprises a first end attached to a first one of the two opposing sidewalls and a second opposite end attached to a second one of the two opposing sidewalls, and wherein a latching mechanism of the accessory is configured to engage the pin.

2. The vehicle of claim 1, wherein each respective attachment port comprises:
    an outer perimeter arranged substantially in the plane of the surrounding outer surface and comprising two parallel sides and curved ends that connect the two parallel sides.

3. The vehicle of claim 1, wherein each of the plurality of attachment ports comprises:
    a rim extending between the recess and the surrounding outer surface, wherein the rim extends less than 10 millimeters above the surrounding outer surface.

4. The vehicle of claim 1, wherein:
    the vehicle body comprises one or more structural elements; and
    each of the plurality of attachment ports is mechanically coupled to one of the one or more structural elements.

5. The vehicle of claim 1, wherein:
    the outer surface comprises a roof surface having a left side and a right side; and
    the plurality of attachment ports comprises:
        two attachment ports arranged on the left side of the roof surface; and
        two attachment ports arranged on the right side of the roof surface.

6. The vehicle of claim 1, wherein:
    the vehicle body comprises a truck bed having a left-side rail and a right-side rail;
    the outer surface comprises a top surface of the left-side rail and a top surface of the right-side rail; and
    the plurality of attachment ports comprises:
        two attachment ports arranged on the top surface of the left-side rail; and
        two attachment ports arranged on the top surface of the right-side rail.

7. The vehicle of claim 1, wherein:
    the outer surface comprises a truck bed having a left-bottom surface and a right-bottom surface; and
    the plurality of attachment ports comprises:
        two attachment ports arranged on the left-bottom surface; and
        two attachment ports arranged on the right-bottom surface.

8. The vehicle of claim 1, wherein:
    the vehicle body comprises a truck bed having a left-side rail and a right-side rail;
    the outer surface comprises:
        a roof surface;
        top surfaces of the left-side rail and the right-side rail; and
        a truck bed surface; and
    the plurality of attachment ports comprises:
        a first pair of attachment ports arranged on the roof surface a first lateral distance away from each other;
        a second pair of attachment ports arranged on the top surfaces a second lateral distance away from each other; and
        a third pair of attachment ports arranged on the truck bed surface a third lateral distance away from each other.

9. The vehicle of claim 8, wherein:
    the first lateral distance is greater than the second lateral distance; and
    the second lateral distance is greater than the third lateral distance.

10. The vehicle of claim 1, wherein the plurality of attachment ports comprises:
    a first pair of attachment ports arranged on a first portion of the outer surface a first lateral distance away from each other; and a second pair of attachment ports arranged on a second portion of the outer surface a second lateral distance away from each other, wherein the first lateral distance is greater than the second lateral distance, the vehicle further comprising:
an accessory configured to:
engage with the first pair of attachment ports in a first configuration; and
engage with the second pair of attachment ports in a second configuration.

11. The vehicle of claim 1, wherein the plurality of attachment ports comprises:
a first pair of attachment ports arranged on a first portion of the outer surface at a first height;
a second pair of attachment ports arranged on a second portion of the outer surface at a second height, wherein the first height is different than the second height by more than 150 millimeters.

12. The vehicle of claim 11, further comprising:
a first accessory having a first pair of attachment plugs configured to engage with the first pair of attachment ports, wherein:
the first pair of attachment ports each comprise a respective pin; and
when the first accessory is engaged with the first pair of attachment ports, the respective pins are positioned at a third height relative to the first pair of attachment plugs; and
a second accessory having a second pair of attachment plugs configured to engage with the second pair of attachment ports, wherein:
the second pair of attachment ports each comprise a respective pin;
when the second accessory is engaged with the second pair of attachment ports, the respective pins are positioned at a fourth height relative to the second pair of attachment plugs; and
the third height is substantially similar to the fourth height.

13. The vehicle of claim 12, wherein:
the first portion of the outer surface comprises a roof surface; and
the second portion of the outer surface comprises top surfaces of a left-side rail and a right-side rail of a truck bed.

14. The vehicle of claim 1, wherein the recess of at least one of the plurality of attachment ports comprises an electrical connector configured to provide power to an accessory engaged with the recess.

15. The vehicle of claim 14, wherein the electrical connector provides a voltage potential across two electrical terminals.

16. The vehicle of claim 14, wherein:
the accessory comprises a light; and
the electrical connector is configured to provide power to the light when the accessory is engaged with an attachment port having the electrical connector.

17. The vehicle of claim 1, further comprising control circuitry, wherein at least one of the plurality of attachment ports comprises:
at least one electrical terminal coupled to the control circuitry; and
an actuated locking mechanism configured to lock the attachment plug of the accessory to the attachment port, wherein the control circuitry is configured to control the actuated locking mechanism.

18. The vehicle of claim 1,
wherein the latching mechanism is configured to constrain relative motion of the attachment plug away from the attachment port.

19. The vehicle of claim 18, wherein the latching mechanism comprises a catch configured to rotate relative to the plug body to engage the pin when the notch is engaged with the pin.

20. The vehicle of claim 1, wherein the opposing side walls have a shape that is configured to maintain a mild form of retention with an outer surface of an attachment plug.

21. The vehicle of claim 1, wherein the two opposing sidewalls additionally comprise corresponding portions that extend above the height of the surrounding outer surface.

22. The vehicle of claim 1, wherein a top of the pin does not extend above the height of the surrounding outer surface.

23. The vehicle of claim 21, wherein an exterior portion of each of the opposing sidewalls that extend above the height of the surrounding outer surface comprises an inward sloping face.

* * * * *